(12) United States Patent
Bawa et al.

(10) Patent No.: US 12,328,070 B2
(45) Date of Patent: Jun. 10, 2025

(54) CONSTANT-ON-TIME POWER CONVERTER WITH ADAPTIVE INTERLEAVING

(71) Applicant: Rambus Inc., San Jose, CA (US)

(72) Inventors: Gaurav Bawa, Austin, TX (US); Panduka Wijetunga, Thousand Oaks, CA (US)

(73) Assignee: Rambus Inc., San Jose, CA (US)

( * ) Notice: Subject to any disclaimer, the term of this patent is extended or adjusted under 35 U.S.C. 154(b) by 234 days.

(21) Appl. No.: 17/959,693

(22) Filed: Oct. 4, 2022

(65) Prior Publication Data

US 2023/0108987 A1    Apr. 6, 2023

Related U.S. Application Data

(60) Provisional application No. 63/252,071, filed on Oct. 4, 2021.

(51) Int. Cl.
*H02M 3/158*   (2006.01)
*H02M 1/00*    (2006.01)

(52) U.S. Cl.
CPC ......... *H02M 3/158* (2013.01); *H02M 1/0043* (2021.05); *H02M 3/1586* (2021.05)

(58) Field of Classification Search
CPC ... H02M 1/0043; H02M 3/1586; H02M 3/158
See application file for complete search history.

(56) References Cited

U.S. PATENT DOCUMENTS

| | | | | |
|---|---|---|---|---|
| 2012/0274293 A1* | 11/2012 | Ren | ..................... | H02M 3/1584 323/271 |
| 2016/0315538 A1* | 10/2016 | Nguyen | ............... | H02M 3/1584 |
| 2019/0190279 A1* | 6/2019 | Xu | ....................... | H02J 7/00712 |
| 2022/0407422 A1* | 12/2022 | Qin | ......................... | H02M 1/14 |

OTHER PUBLICATIONS

Su, Yi-Ping et al., "Pseudo-Ramp Current Balance (PRCB) Technique With Offset Cancellation Control (OCC) in Dual-Phase DC-DC Buck Converter", IEEE Transactions on Very Large Scale Integration (VLSI) Systems, vol. 22, No. 10, doi: 10.1109/TVLSI.2013.2283606, Oct. 2014, pp. 2192-2205. 14 pages.

Tian, Shuilin et al., "A Three-Terminal Switch Model of Constant On-Time Current Mode With External Ramp Compensation", IEEE Transactions on Power Electronics, 31.1-1.10.1109/TPEL.2015.2508037, 2015. 10 pages.

Xiong, Yi et al., "Constant On-time Controlled Four-phase Buck Converter via Saw-tooth-wave Circuit and its Element Sensitivity", Proceedings of International Conference on Mechanical, Electrical and Medical Intelligent System 2017, 6 pages.

* cited by examiner

*Primary Examiner* — Harry R Behm
(74) *Attorney, Agent, or Firm* — Womble Bond Dickinson (US) LLP

(57) ABSTRACT

A power converter includes a plurality of power stages configured to generate an output current that has an output voltage, based on an input current that as an input voltage. The plurality of power stages comprises a first power stage and one or more additional power stages. The power converter also includes a control circuit coupled to the plurality of power stages. The control circuit is configured to periodically turn on each of the plurality of power stages. The control circuit determines a respective time delay between turning on the first power stage and turning on each of the one or more additional power stages based on a switching time-period of the first power stage.

14 Claims, 7 Drawing Sheets

CONSTANT-ON-TIME POWER CONVERTER WITH ADAPTIVE INTERLEAVING

RELATED APPLICATION

This patent application claims priority under USC Section 119(e) to Provisional U.S. Patent Application No. 63/252,071 filed Oct. 4, 2021, which is incorporated by reference in its entirety.

BACKGROUND

Electronic or computing devices use electric current to operate or provide power to internal components. These electronic or computing devices often use a specific voltage that may be different from the voltage provided by a power source (e.g., a battery, direct current (DC) to DC (DC/DC) converter, etc.). A power converter may be used when an electronic or computing device uses a voltage that may be different from the voltage provided by a power source. A power converter may be a circuit that converts a current (e.g., a direct current) from one voltage to another voltage. The power converter may receive an input current with a first voltage and may generate an output current at a second voltage.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
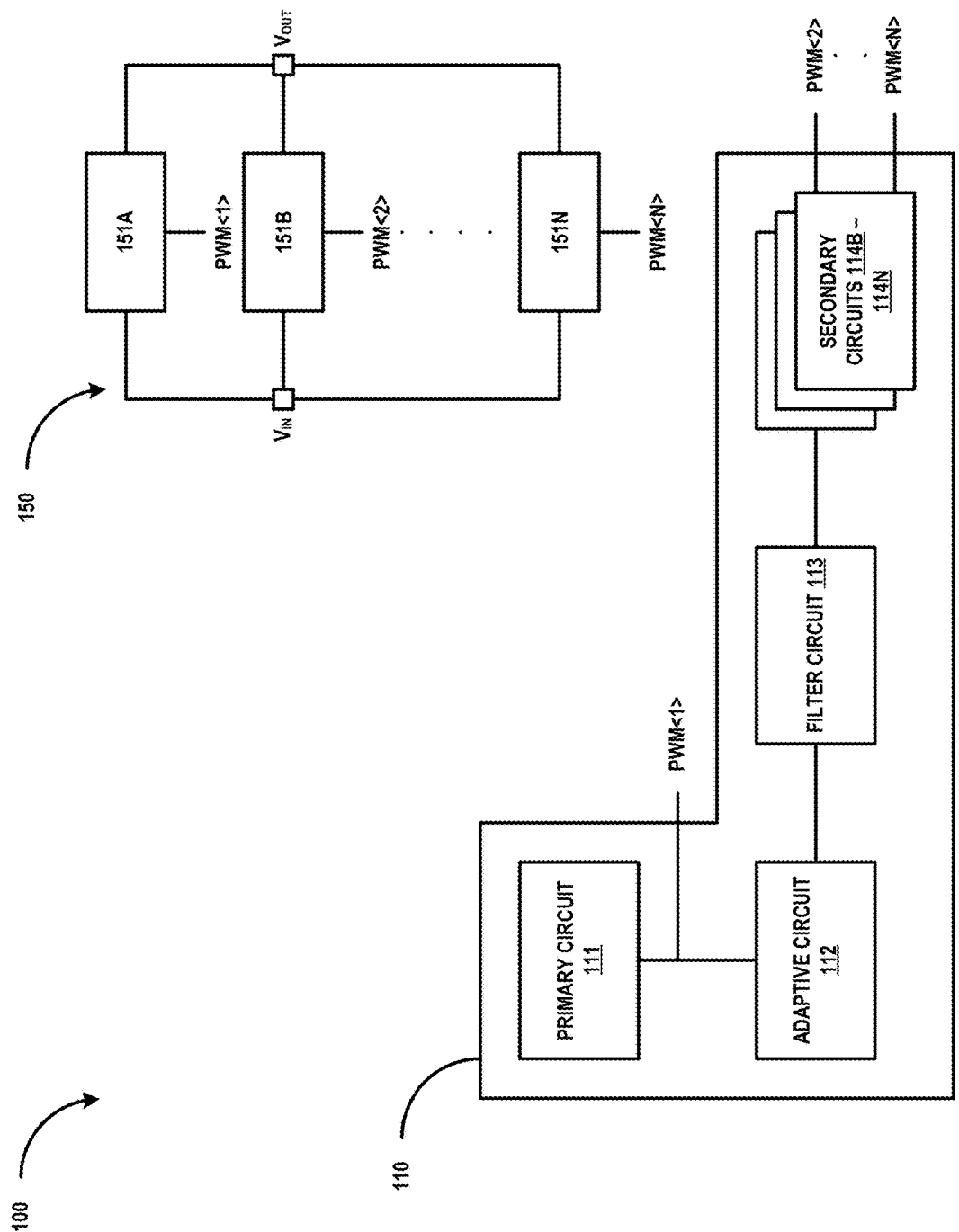
FIG. 1 illustrates a block diagram of an apparatus having a power converter to generate an output current based on an input current, according to an embodiment.

In the following description, various aspects of the illustrative embodiments will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials, and configurations are set forth in order to provide a thorough understanding of the illustrative embodiments. In other instances, well-known features are omitted or simplified in order not to obscure the illustrative embodiments.

A power converter is a device that converts power from one form into another. For example, a DC/DC power converter may be a circuit or electromechanical device that converts a current (e.g., a direct current) from one voltage to another voltage. The present disclosure will be made primarily with reference to DC/DC converters, it being understood the present disclosure should not be limited thereto.

A power converter may receive an input current at an input voltage and may generate an output current at an output voltage. A power converter may include multiple power stages that generate the output voltage. For example, a power converter may generate the output current using different power stages at different times (e.g., may cycle or interleave through all the different power stages). When a power converter uses multiple power stages, this may be referred to as operating in multi-phase mode. The power converter may also use a single power stage to generate the output current. This may be referred to as operating in single-phase mode. In addition, there are additional modes of power converter operations. For example, a power converter may operate in a continuous conduction mode (CCM) or a discontinuous conduction mode (DCM).

A fixed frequency power converter may operate in multi-phase mode easily, but may have a slower transient response. In addition, when the fixed frequency power converter is in single-phase mode, using DCM may be more problematic in light load conditions. A constant-on-time (COT) power converter may have a faster transient response (when compared to a fixed frequency power converter) and may be able to operate in CCM or DCM more easily (when compared to a fixed frequency power converter). However, multi-phase COT power converters are difficult to implement. For example, COT power converters may have problems maintaining phase or stage interleaving.

The various embodiments, examples, or implementations described herein provide a power converter (e.g., a COT power converter) that can adapt or vary the interleaving of the multiple power stages of the power converter. The power converter can change when different power stages should turn one (e.g., may interleave the different power stages) based on the switching time-period of a first or primary power stage. This allows the power converter to have adaptive delays for the different power stages, based on the switching time-period of a first or primary power stage.

In one embodiment, adapting or varying the time delay of the multiple power stages of the power converter may preserve phase interleaving during steady-state operation of the power converter. This may also reduce the number of input and output capacitors that may be needed by the power converter. The power converter may be able to preserve steady-state phase interleaving across load, processes used to manufacture the power converter, voltage, and temperature variations.

In one embodiment, a power converter is provided. The power converter includes a plurality of power stages configured to generate an output current that has an output voltage, based on an input current that as an input voltage. The plurality of power stages comprises a first or primary power stage and additional or secondary power stages. The power converter also includes a control circuit coupled to the plurality of power stages. The control circuit is configured to periodically turn on each of the plurality of power stages. The control circuit determines a respective time delay between turning on the first power stage and turning on each of the additional power stages based on a switching time-period of the first power stage.

In one embodiment, a power converter is provided. The power converter includes a means for generating an output current that has an output voltage, based on an input current that as an input voltage. The means for generating comprises a first or primary power stage and additional or secondary power stages. The power converter also includes a second means. This second means is used for controlling the means for generating the output current. The second means for controlling the means for generating the output current is configured to periodically turn on each of the first power stage and the additional power stages. The second means for controlling the means for generating the output current determines a respective time delay between turning on the first power stage and turning on each of the additional power stages based on a switching time-period of the first power stage.

In one embodiment, a method is provided. The method includes determining a switching time-period of a first power stage of a plurality of power stages. The plurality of power stages comprises the first or primary power stage and additional or secondary power stages. The plurality of power stages is configured to generate an output current that has an output voltage, based on an input current that as an input voltage. The method also includes determining a respective time delay between turning on the first power stage and turning on each of the additional power stages based on the switching time-period of the first power stage.

FIG. 1 illustrates a block diagram of an apparatus 100 (e.g., a device, a circuit, a plurality of electrically connected circuits, etc.) having a power converter to generate an output current (that has an output voltage or a first voltage) based on an input current (that has an input voltage or a second voltage). As shown in FIG. 1, in one embodiment, the apparatus 100 comprises a control circuit 110 and a set of power stages 150. It should also be understood that the apparatus 100 may include one or more additional or alternative components than those shown in FIG. 1. As discussed above, the apparatus 100 may be a power converter. In one embodiment, the apparatus 100 may be a DC/DC converter. A DC/DC converter may also be referred to as a DC/DC power converter.

In one embodiment, the apparatus 100 may be a boost converter. A boost converter may be a power converter (e.g., a DC/DC converter) that increases voltage from its input (e.g., supply) to its output (e.g., load). In another embodiment, the apparatus 100 may be a buck converter. A buck converter may be a power converter (e.g., a DC/DC converter) that decreases voltage from its input (e.g., supply) to its output (e.g., load). In a further embodiment, the apparatus 100 may be a buck-boost converter. A buck-boost converter may be a power converter (e.g., a DC-DC converter) that is able to both increase voltage from its input to its output, and decrease voltage from its input to its output.

In one embodiment, the apparatus 100 can operate in a single-phase mode. When the apparatus 100 (e.g., a DC-DC converter) operates in the single-phase mode, only one of the set of power stages 150 may generate an output current with the output voltage $V_{OUT}$ using an input current with the input voltage $V_{IN}$. For example, only power stage 151A may generate the output current with the output voltage $V_{OUT}$ when the apparatus 100 operates in the single-phase mode.

In one embodiment, the apparatus 100 can operate in a multiphase mode. When the apparatus 100 operates in the multi-phase mode, at least two of the set of power stages 150 may generate output current with the output voltage $V_{OUT}$ using the input current with the input voltage $V_{IN}$. For example, two, six, or any other appropriate number of power stages of the set of power stages 150 may be used to generate the output current with the output voltage $V_{OUT}$ when the apparatus 100 operates in the multi-phase mode. The individual power stages 151A through 151N may operate in different duty cycles when operating in the multi-phase mode, as discussed in more detail below.

As illustrated in FIG. 1, the control circuit 110 includes a primary circuit 111, an adaptive circuit 112, a filter circuit 113, and secondary circuits 114B through 114N. The primary circuit 111, the adaptive circuit 112, the filter circuit 113, and the secondary circuits 114B through 114N are discussed in more detail below.

Also as illustrated in FIG. 1, the apparatus 100 includes a set of power stages 150. The set of power stages 150 may receive an input voltage (e.g., $V_{IN}$) from a supply (e.g., a power source, a power supply, etc.). The set of power stages 150 may generate an output current with the output voltage (e.g., $V_{OUT}$) based on an input current with the input voltage (e.g., $V_{IN}$). The set of power stages 150 include individual power stages 151A through 151N. The number of power stages in the set of power stages 150 may be different in different embodiments. For example, two, ten, seventeen, or any other appropriate number of power stages may be used.

The set of power stages 150 are coupled (e.g., communicatively coupled, directly coupled, indirectly coupled, etc.) to the control circuit 110. In one embodiment, the control circuit 110 may control the operation of the set of power stages 150. The control circuit 110 may control the duty cycle of each of the individual power stages 151A though 151N. The control circuit 110 may control the timing and the switching frequency of each of the individual power stages 151A through 151N (e.g., may interleave or cycle between the power stages 151A through 151N).

In one embodiment, the control circuit 110 may periodically turn on each of the power stages 151A through 151N. The control circuit 110 may control the duty cycle of each of the power stages 151A through 151N (e.g., the amount of time that each of the power stages 151A through 151N is turned on and/or turns off). The control circuit 110 may turn on each power stage 151A through 151N at different times, as discuss in more detail below.

In one embodiment, the control circuit 110 may determine a respective time delay between turning on power stage 151A (e.g., a first power stage or a primary power stage) and turning on each of the additional power stages (e.g., secondary power stages 151B through 151N) based on a switching time-period of the power stage 151A. The switching time-period of the power stage 151A (e.g., the first power stage) may be the period or amount of time between two consecutive times when the power stage 151A was turned on.

In one embodiment, the primary circuit 111 may generate a first control signal to control power stage 151A (e.g., to turn the power stage 151A on and/or off). For example, the primary circuit 111 may periodically generate the first control signal (e.g., PWM<1>). Each time the first control signal is generated and provided to the power stage 151A, the power stage 151A may turn on for an amount of time (e.g., $T_{ON}$). The primary circuit 111 is discussed in more detail below.

In one embodiment, the adaptive circuit 112 may determine a respective delay time (e.g., an amount of time) for each of the power stages 151B through 151N (e.g., additional power stages, secondary power stages, etc.). The adaptive circuit 112 may determine a delay between when the power stage 151A was turned on, and when the respective power stage 151B through 151N should turn on. For example, the adaptive circuit 112 may determine a first delay between when the power stage 151A was turned on and when the power stage 151B should turn on, a second delay between when the power stage 151A was turned on and when the power stage 151C should turn on, etc.

In one embodiment, the control circuit 110 may include a first set of capacitors (e.g., one or more capacitors) that are coupled to a current source. The first set of capacitors may be used to determine the switching time-period for the power stage 151A (e.g., the switching period, the amount of time between when the power stage 151A is turned on). For example, the amount of time for the first set of capacitors to charge may be the switching time-period. The adaptive circuit 112 may include a second set of capacitors (e.g., one or more capacitors) that are coupled to the current source. The second set of capacitors may be used to determine when to turn on the power stages 151B through 151N, as discussed in more detail below. For example, there may be different subsets of capacitors for each of the power stages 151B through 151N. The amount of time for each subset of capacitors to charge may be the delay for a respective power stage. The current source may be separate from the control circuit 110 and/or may be separate from the input current source that is provided to the set of power stages 150.

In one embodiment, the filter circuit 113 may filter a voltage or signal generated by the adaptive circuit 112. For example, the filter circuit 113 may be a low-pass filter that may filter a voltage generated by the adaptive circuit 112.

In one embodiment, the secondary circuits 114B through 114N may periodically turn on the power stages 151B through 151N. The secondary circuits 114B through 114N may turn on the power stages 151B through 151N based on the switching time-period of the power stage 151A. For example, secondary circuit 114B may turn on (and/or off) power stage 151B based on the switching time-period of the power stage 151A, secondary circuit 114C may turn on (and/or off) power stage 151C based on the switching time-period of the power stage 151A, etc.

As discussed above, the control circuit 110 may turn on each of the power stages 151B through 151N (e.g., additional/secondary power stages) based on a switching time-period of the power stage 151A (e.g., a first/primary power stage). This may allow the control circuit 110 to vary or change the respective delay time for the power stages 151B through 151N based on the switching time-period of the first power stage 151A. Varying the delay times for the power stages 151B through 151N may allow the control circuit to adaptively interleave the operation of the power stages 151B through 151N with the operation of the power stage 151A.

Figure 2:
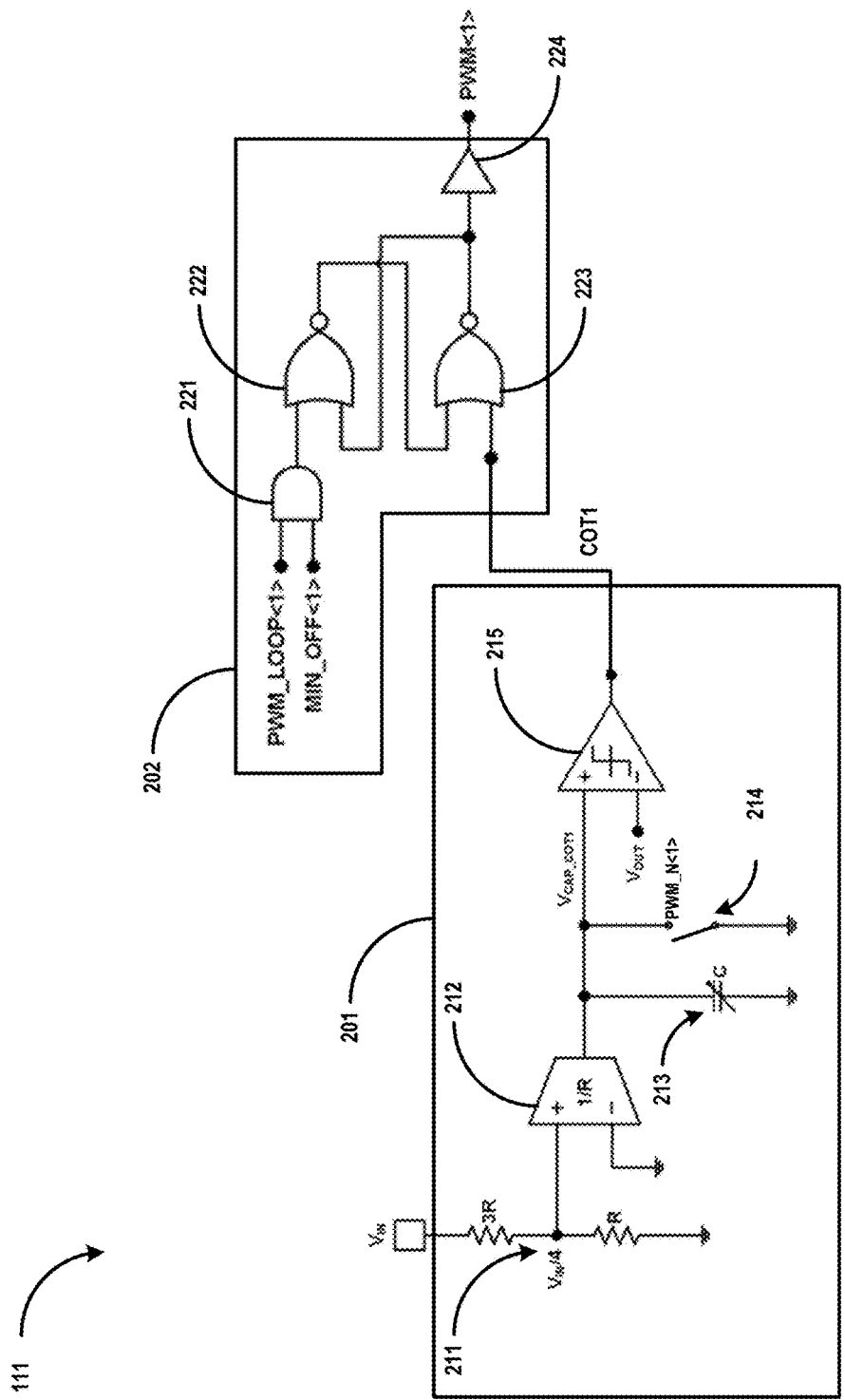
FIG. 2 illustrates one embodiment the primary circuit of FIG. 1, according to an embodiment.

FIG. 2 illustrates the primary circuit 111 of FIG. 1, according to an embodiment. As discussed above, the primary circuit 111 may control the operation of power stage 151A illustrated in FIG. 1 (e.g., may turn on and/or turn off the power stage 151A). The primary circuit 111 includes a timer 201 (e.g., a timer circuit) and a COT latch 202. The primary circuit 111 includes a resistive divider 211, an amplifier 212, a capacitor 213, a switch 214, and a comparator 215. The COT latch 202 includes an AND gate 221, a NOR gate 222, a NOR gate 223, and a logic buffer 224.

In one embodiment, the primary circuit 111 may receive the input current (which has the voltage $V_{IN}$) that was provided to the set of power stages 150 (illustrated in FIG. 1). The resistive divider 211 may reduce the voltage of the input current. The resistive divider 211 includes a resistor 3R and a resistor R. The reduce voltage is provided to the amplifier 212 (e.g., a transconductance amplifier). The amplifier 212 is also coupled to ground. The amplifier 212 may generate an amplified voltage that is provided to the capacitor 213 (e.g., a variable capacitor). The output of the amplifier 212 may also be coupled to the switch 214 that is coupled to ground. The switch 214 may be controlled based on the control signal PWM_N<1> generated by the logic buffer 224. The control signal PWM_N<1> may be the inverse/opposite of control signal PWM<1> (e.g., not (PWM<1>)).

In one embodiment, the output of the amplifier 212 (e.g., a transconductance amplifier) and the capacitor 213 (e.g., $V_{CAP\_COT1}$) may be provided to the comparator 215. The comparator 215 is also coupled to the output of the set of power stages 150. The comparator 215 may compare the output of the amplifier 212 and the capacitor 213, $V_{CAP\_COT1}$, with the voltage $V_{OUT}$ (e.g., the voltage of the output current). The comparator 215 may generate a signal COT1 that is provided to the COT latch 202.

The COT latch 202 may receive the signals PWM_LOOP<1> and MIN_OFF<1>, which are provided as inputs to AND gate 221. PWM_LOOP<1> may be generated by a PWM voltage loop comparator (not illustrated in the figures). The signal MIN_OFF<1> may be used to prevent the primary circuit 111 from generating the control signal PWM<1> before a period of time has elapsed (e.g., prevent the primary circuit 111 from generating the control signal PWM<1> before a minimum off time has elapsed). For example, MIN_OFF<1> may be generated by a timer that expires after a fixed delay, after PWM<1> goes low. The output of AND gate 221 is provided to NOR gate 222. The output of the NOR gate 222 is provided to the first input of the NOR gate 223. The signal COT1 may be provided to the second input of the NOR gate 223. The output of the NOR gate 223 is provided to the logic buffer 224 and the logic buffer 224 generates the signal PWM<1> (e.g., a control signal) that is used to control the power stage 151A. For example, the control signal PWM<1> may be provided to the power stage 151A. When the control signal PWM<1> is high (e.g., "1"), the power stage 151A may turn on for an amount of time $T_{ON}$.

Figure 3:
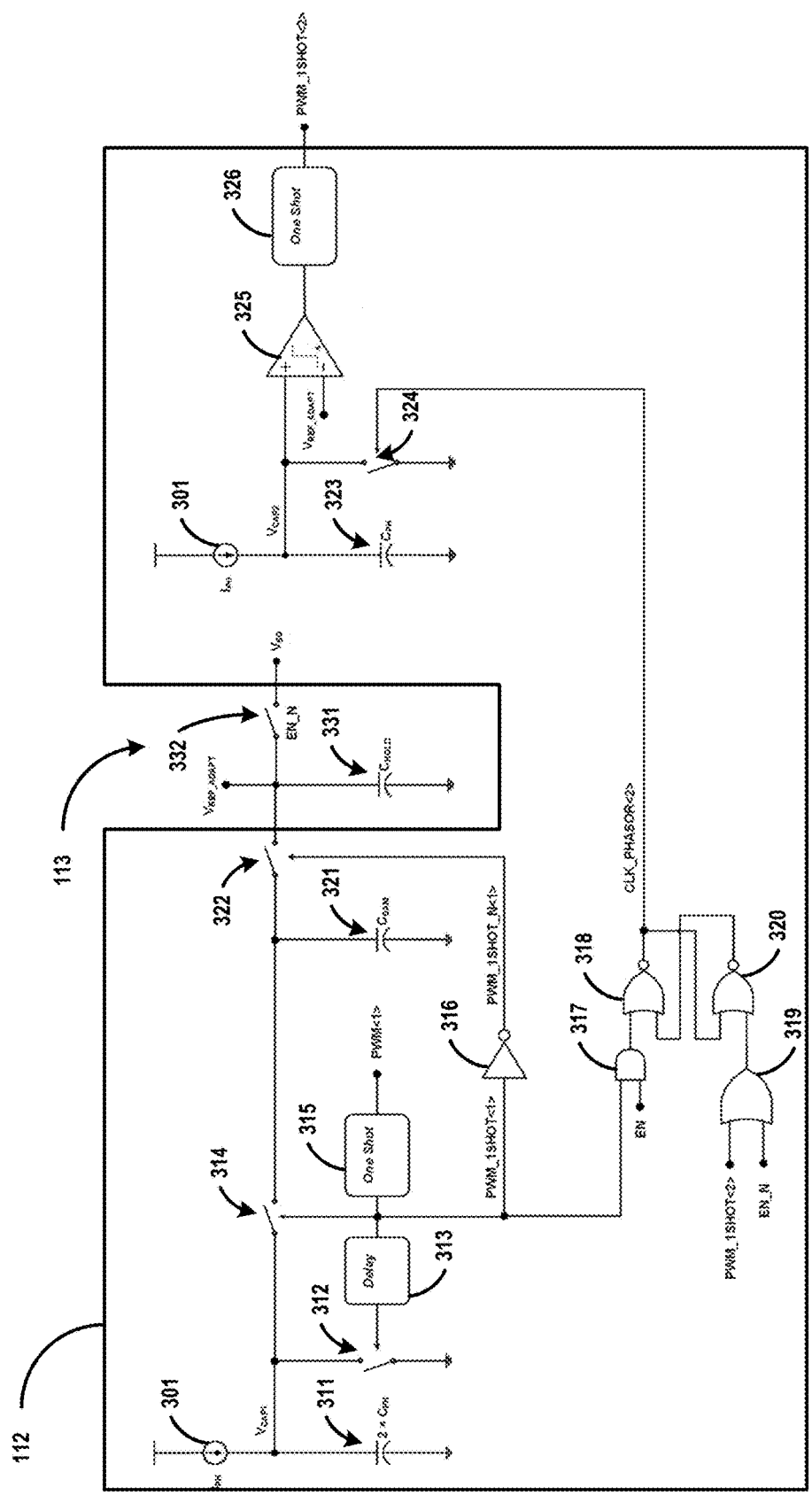
FIG. 3 illustrates the adaptive circuit of FIG. 1, according to an embodiment.

FIG. 3 illustrates the adaptive circuit 112 and filter circuit 113 of FIG. 1, according to an embodiment. As discussed above, the adaptive circuit 112 may determine a respective delay time (e.g., an amount of time) for each of the power stages 151B through 151N (illustrated in FIG. 1). Also as discussed above, the filter circuit 113 may filter a voltage or signal generated by the adaptive circuit.

In one embodiment, the adaptive circuit 112 may receive a current ($I_{PH}$) from current source 301. A capacitor 311 (e.g., a first capacitor or a first set of capacitors) of the adaptive circuit 112 may be charged by the current $I_{PH}$. Although one capacitor 311 is illustrated in FIG. 3, multiple capacitors may be used in other embodiments. The output of the capacitor 311 ($V_{CAP1}$) may be provided to switch 314 and to a switch 312 once the capacitor 311 is fully charged. The switch 312 is coupled to ground and may be controlled by a delay circuit 313. The delay circuit 313 is controlled by the one shot circuit 315. The one shot circuit 315 may transmit a signal PWM_1SHOT<1> to the delay circuit 313 based on the signal PWM<1> generated by the primary circuit 111 (illustrated in FIGS. 1 and 2). The signal PWM_1SHOT<1> is also provided to an inverter 316. The inverter 316 may generate the signal PWM_1SHOT_N<1> which may be used to control switch 322. The voltage $V_{CAP1}$ may be provided to the capacitor 321 when the switch 314 is closed (e.g., allows current to flow through the switch 314). The voltage $V_{CAP1}$ may be provided to the filter circuit 113.

The filter circuit 113 includes a capacitor 331 and a switch 332. When the switch 332 is closed, the filter circuit 113 may use the voltage $V_{CAP1}$ and $V_{REF\_ADAPT}$ to charge the capacitor 331. Once the capacitor 331 is charged, the capacitor 331 may generate the voltage $V_{BG}$.

The signal PWM_1SHOT<1> (generated by the one shot circuit 315) may also be provided to an AND gate 317. An enable signal EN (e.g., a chip enable signal or a signal that indicates that indicates a particular circuit should operate) is also provided to the AND gate 317. The output of the AND gate 317 is provided to a NOR gate 318. The NOR gate 318 may generate the signal CLK_PHASOR<2> based on the output of the AND gate 317 and the output of the NOR gate 320. A signal PWM_1SHOT<2> (generated by one shot circuit 326 and a signal EN_N (e.g., an inverse of the enable signal EN) are provided to an OR gate 319. The output of the OR gate is provided to NOR gate 320. The output of the NOR gate 318 is also provided to the NOR gate 320.

As illustrated in FIG. 3, the current $I_{PH}$ is also provided to the capacitor 323 (e.g., a second capacitor or a second set of capacitors). Although one capacitor 323 is illustrated in FIG. 3, multiple capacitors may be used in other embodiments. In one embodiment, the capacitor 323 may be half the capacity of the capacitor 311. For example, if the power converter is a 2-phase power converter, the capacitor 323 may be half the capacity of the capacitor 311 to get 180-degrees of phase interleaving.

Once the capacitor 323 is charged, the voltage $V_{CAP2}$ may be provided to the comparator 325. The comparator 325 also receives the voltage $V_{REF\_ADAPT}$. The comparator 325 may compare the voltage $V_{CAP2}$ with the voltage $V_{REF\_ADAPT}$. Once the voltage $V_{CAP2}$ exceeds the voltage $V_{REF\_ADAPT}$, the comparator 325 may generate a logic high signal for the one shot circuit 326. The one shot circuit 326 may receive the signal from the comparator 325 and may generate the signals PWM_1SHOT<2> which may be used to control one or more additional power stages of a power converter (e.g., power stage 151B illustrated in FIG. 1).

Although the adaptive circuit 112 illustrated in FIG. 3 may be used in a 2-phase power converter, the adaptive circuit 112 may be modified for higher phase converters. For example, additional capacitors, one shot circuits, comparators, etc., may be used to generate additional signals that may be provided to additional secondary circuits. The capacity of the additional capacitors may be based on the number of stages (e.g., phases) in the power converter. In particular, the capacity of the additional capacitors may be proportional to the number of stages. For example, if there are four, there may be four sets of capacitors. The first set of capacitors may be for the first phase and may have a total capacity C1. The second set of capacitors may be for the second phase and may have a total capacity of ((¼)*C1). The third set of capacitors may be for the third phase and may have a total capacity of ((²⁄₄)*C1). The fourth set of capacitors may be for the fourth phase and may have a total capacity of ((¾)*C1).

Figure 4:
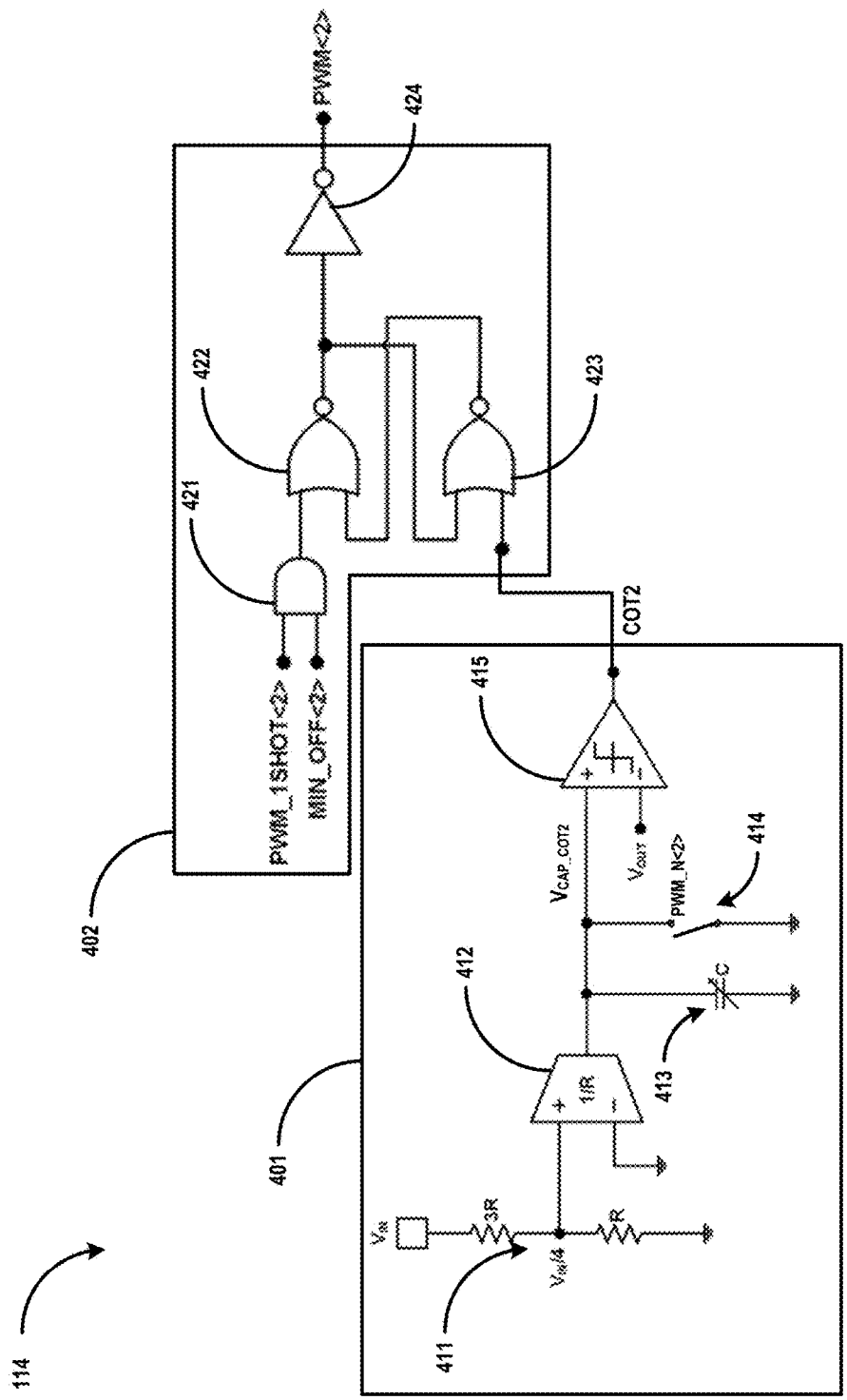
FIG. 4 illustrates the secondary circuit of FIG. 1, according to an embodiment.

FIG. 4 illustrates the secondary circuit 114 of FIG. 1, according to an embodiment. As discussed above, the secondary circuit 114 may control the operation of power stage 151B (and/or power stages 151C-151N) illustrated in FIG. 1 (e.g., may turn on and/or turn off the power stage 151B). The secondary circuit 114 includes a timer 401 (e.g., a timer circuit) and a COT latch 402. The secondary circuit 114 includes a resistive divider 411, an amplifier 412, a capacitor 413, a switch 414, and a comparator 415. The COT latch 402 includes an AND gate 421, a NOR gate 422, a NOR gate 423, and an inverter 424.

In one embodiment, the secondary circuit 114 may receive the input current (which has the voltage $V_{IN}$) that was provided to the set of power stages 150 (illustrated in FIG. 1). The resistive divider 411 may reduce the voltage of the input current. The resistive divider 411 includes a resistor 3R and a resistor R. The reduce voltage is provided to the amplifier 412 (e.g., a transconductance amplifier). The amplifier 412 is also coupled to ground. The amplifier 412 may generate an amplified voltage that is provided to the capacitor 413 (e.g., a variable capacitor). The output of the amplifier 412 may also be coupled to the switch 414 that is coupled to ground. The switch 414 may be controlled based on the control signal PWM_N<2> generated by the inverter 424. The control signal PWM_N<2> may be the inverse/opposite of control signal PWM<2> (e.g., not (PWM<2>).

In one embodiment, the output of the amplifier 412 and the capacitor 413 (e.g., $V_{CAP\_COT2}$) may be provided to the comparator 415. The comparator 415 is also coupled to the output of the set of power stages 150. The comparator 415 may compare the output of the amplifier 412 and the capacitor 413, $V_{CAP\_COT2}$, with the voltage $V_{OUT}$ (e.g., the voltage of the output current). The comparator 415 may generate a signal COT2 that is provided to the COT latch 402.

The COT latch 402 may receive the signals PWM_1SHOT<2> and MIN_OFF<2>, which are provided as inputs to AND gate 421. PWM_1SHOT<2> may be generated by the adaptive circuit 112 illustrated in FIGS. 1 and 3. The signal MIN_OFF<2> may be used to prevent the secondary circuit 114 from generating the control signal PWM<2> before a period of time has elapsed (e.g., prevent the secondary circuit 114 from generating the control signal PWM<2> before a minimum off time has elapsed). For example, MIN_OFF<2> may be generated by a timer that expires after a fixed delay, after PWM<2> goes low. The output of AND gate 421 is provided to NOR gate 422. The output of the NOR gate 422 is provided to the first input of the NOR gate 423. The signal COT2 may be provided to the second input of the NOR gate 423. The output of the NOR gate 423 is provided to the inverter 424 and the amplifier generates the signal PWM<2> (e.g., a control signal) that is used to control the power stage 151B. For example, the control signal PWM<2> may be provided to the power stage 151B. When the control signal PWM<2> is high (e.g., "1"), the power stage 151B may turn on for an amount of time $T_{ON}$.

Figure 5:
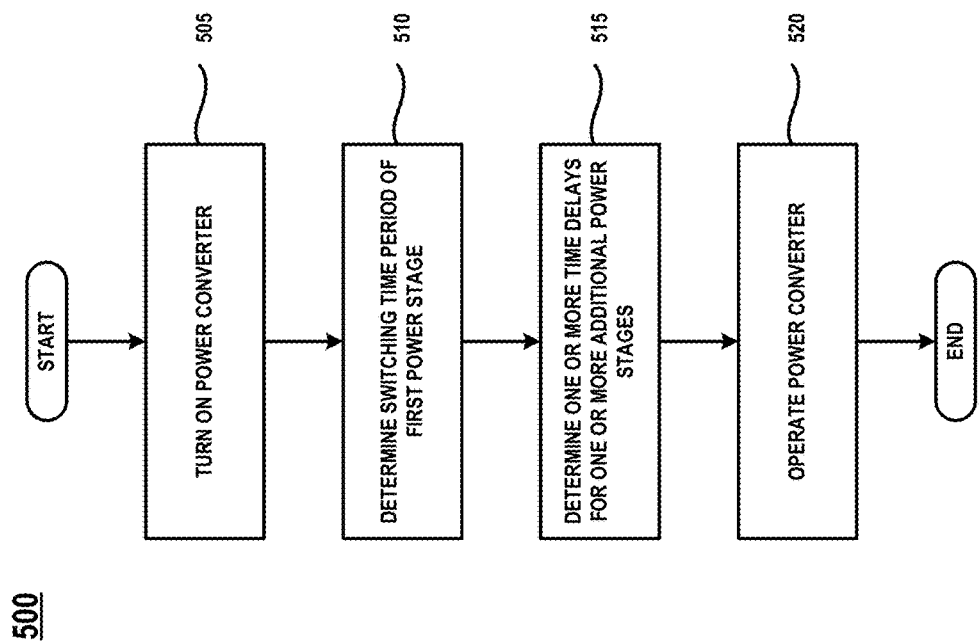
FIG. 5 is a flow diagram of a method for operating a power converter, according to an embodiment.

FIG. 5 is a flow diagram of a method 500 for operating a power converter, according to an embodiment. Method 500 may be performed by processing logic that may comprise hardware (e.g., circuitry), software (e.g., instructions running/executing on a processing device), firmware (e.g., microcode), or a combination thereof. In some embodiments, the method 500 may be performed by apparatus 100 (illustrated in FIG. 1) or portions of the apparatus 100 (illustrated in FIGS. 2-4).

As illustrated in FIG. 5, the method 500 starts at block 505 where the method 500 comprises turning on the power converter. For example, the circuits of the power converter may be turned on and/or an input current (with an input voltage) may be provided to the power converter. At block 510, the method 500 comprises determining the switching time-period of the first power stage of the power converter. For example, a first set of capacitors for the first power stage may be charged. The amount of time to charge the first set of capacitors (for the first power stage) may be the switching time-period of the first power stage. The method 500 comprises determining one or more time delays for one or more additional power stages at block 515. For example, the power converter may include additional sets of capacitors for additional power stages (e.g., one additional set of capacitors for each additional power stage). The amount of time for a set of capacitors to charge may be the time delay for the respective additional power stage. At block 520, the method 500 comprises operating the power converter to generate an output current (which has an output voltage) based on the input current, the switching time-period, and the one or more time delays. For example, the first power stage may be turned on/off based on the switching time-period. The additional power stages may be turned on/off based on the one or more time delays.

Apparatus 100 shown within FIG. 1 provides consistent power to a load while operating at steady state. That may not be true when apparatus 100 is in transition in response to a change in load requirements. Load demands for power may increase. This in turn may require apparatus 100 to provide more current to the load at output voltage $V_{OUT}$. Or apparatus 100 may transition from DCM to CCM. Ultimately, an increase in power demand by load or a transition from DCM to CCM may require an increase in the switching frequency (i.e., switching time-period) of the primary circuit 111 and/or one or more of the secondary circuits 114. During the transition, power provided to the load by apparatus 100 may fluctuate until apparatus 100 reaches steady state.

To illustrate with reference to adaptive circuit 112 of FIG. 3, when PWM <1> is asserted one shot circuit 315 triggers PWM_1SHOT<1>, which closes switch 314 and opens switch 312. The voltage on capacitor 311 is transferred to capacitor 321 via closed switch 314. It is noted that capacitor 311 is substantially larger than capacitor 321. When PWM_1SHOT<1> is de-asserted, switch 314 opens, which isolates capacitor 321. Switch 322 closes after a slight delay introduced by inverter 316, thereby transferring charge on capacitor 321 to capacitor 331. Voltage $V_{REF\_ADAPT}$ increases as capacitor 331 is charged. $V_{REF\_ADAPT}$ is provided to the negative terminal of comparator 325. Switch 332 is open during normal operation of adaptive circuit 112. Initially capacitor 323 is grounded through closed switch 324. Soon after assertion of PWM_1SHOT<1>, switch 324 opens, and capacitor 323 begins charging through constant current source 301. It is noted that capacitors 323 and 311 are charged by currents from current sources 301 of substantially equal magnitudes. Capacitor 311 is twice the size of capacitor 323. Thus, the rate at which capacitor 323 charges is twice as fast as the rate at which capacitor 311 charges. The voltage $V_{CAP2}$ on capacitor 323 is provided to the positive terminal of comparator 325. $V_{CAP2}$ increases as capacitor 323 charged. When the voltage $V_{CAP2}$ reaches $V_{REF\_ADAPT}$, comparator 325 triggers, which causes one shot circuit 326 to assert PWM_1SHOT<2>, which in turn controls secondary circuit 114B.

In steady-state operation of apparatus 100, the switching frequency of PWM_1SHOT<2> is substantially equal to the frequency of PWM<1>. However, if the switching frequency of PWM<1> is required to increase because of, for example, an increase in load requirements, switch 324 may close before $V_{CAP2}$ reaches $V_{REF\_ADAPT}$. As result, comparator 325 may not trigger, and accordingly PWM_1SHOT<2>, and thus PWM<2>, may not assert when they should. The same problem could extend to PWM<3>-PWM<N>. Eventually, apparatus 100 reaches steady-state, and PWM<2>-PWM<N> will have switching frequency that equals PWM<1>. However, until apparatus 100 reaches steady-state, power provided by apparatus 100 to its load may fluctuate.

Figure 6:
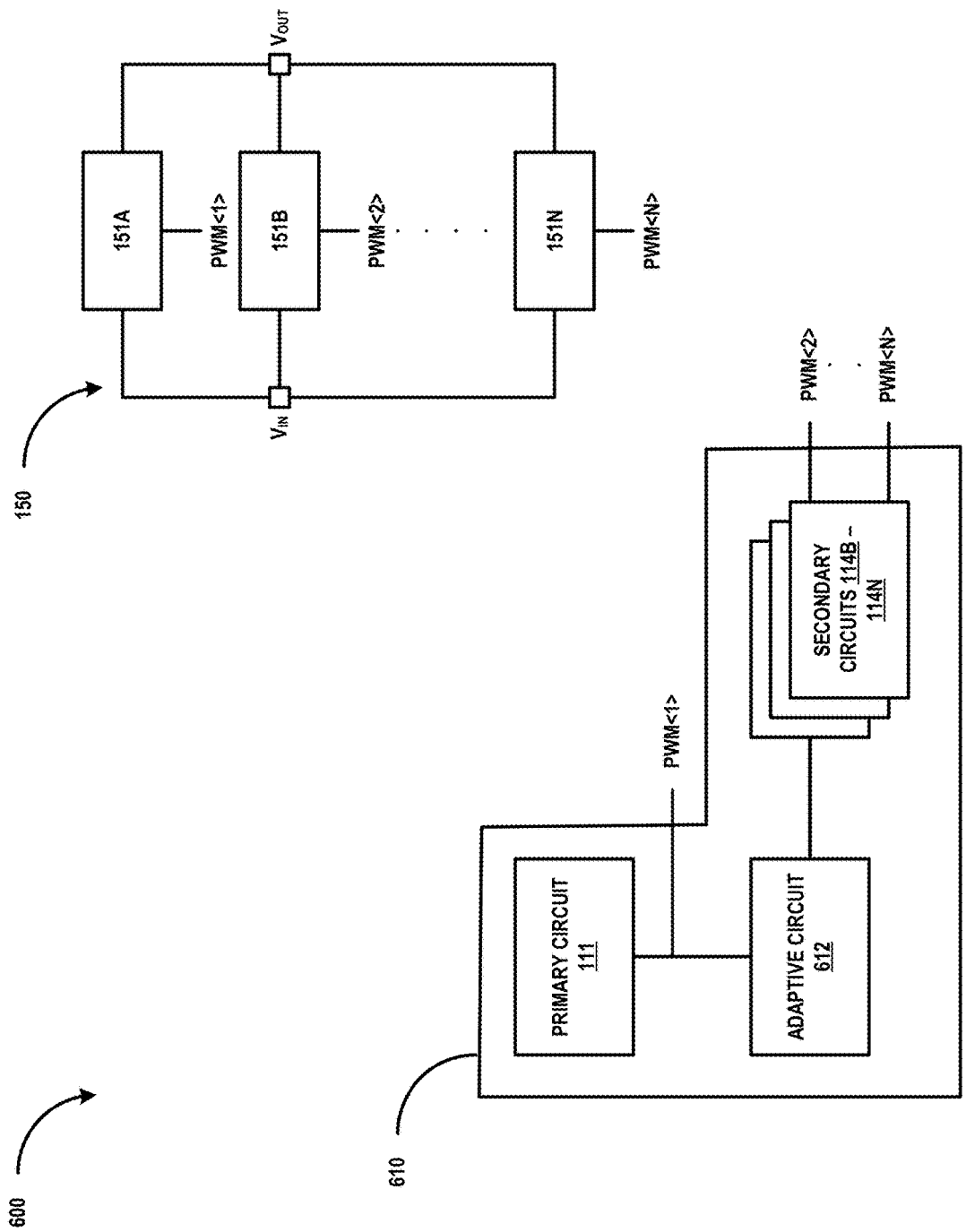
FIG. 6 illustrates a block diagram of an apparatus having a power converter to generate an output current based on an input current, according to another embodiment.

FIG. 6 illustrates a block diagram of an apparatus 600 that addresses the foregoing problem and others. Apparatus 600 (e.g., a device, a circuit, a plurality of electrically connected circuits, etc.) provides a power converter to generate an output current (that has an output voltage or a first voltage) to a load based on an input current (that has an input voltage or a second voltage). As shown in FIG. 6, in one embodiment, the apparatus 600 includes a control circuit 610 and a set of power stages 150.

In one embodiment, the apparatus 600 may be a DC/DC converter. In one embodiment, the apparatus 600 may be a boost converter. In another embodiment, the apparatus 600 may be a buck converter. In a further embodiment, the apparatus 600 may be a buck-boost converter.

Apparatus 600 can operate in a single-phase mode. When apparatus 600 operates in the single-phase mode, only one of the set of power stages 150 may generate an output current with output voltage $V_{OUT}$ using an input current with input voltage $V_{IN}$. For example, only power stage 151A may generate the output current with output voltage $V_{OUT}$ when the apparatus 600 operates in the single-phase mode.

Apparatus 600 can operate in a multiphase mode. When apparatus 600 operates in the multi-phase mode, at least two of the set of power stages 150 may generate output current with output voltage $V_{OUT}$ using the input current with input voltage $V_{IN}$. For example, two, six, or any other appropriate number of power stages of the set of power stages 150 may be used to generate the output current with the output voltage $V_{OUT}$ when the apparatus 600 operates in the multi-phase mode. The individual power stages 151A through 151N may operate with different duty cycles when operating in the multi-phase mode.

As illustrated in FIG. 6, the control circuit 610 includes a primary circuit 111, an adaptive circuit 612, and secondary circuits 114B through 114N. The adaptive circuit 612 is discussed in more detail below. Apparatus 600 also includes a set of power stages 150. The set of power stages 150 may receive an input voltage (e.g., $V_{IN}$) from a supply (e.g., a power source, a power supply, etc.). The set of power stages 150 may generate an output current with output voltage (e.g., $V_{OUT}$) based on an input current with input voltage (e.g., $V_{IN}$). The set of power stages 150 include individual power stages 151A through 151N. The number of power stages in the set of power stages 150 may be different in different embodiments. For example, two, ten, seventeen, or any other appropriate number of power stages may be used.

The set of power stages 150 are coupled (e.g., communicatively coupled, directly coupled, indirectly coupled, etc.) to the control circuit 610. In one embodiment, control circuit 610 may control the operation of the set of power stages 150. The control circuit 610 may control the duty cycle of each of the individual power stages 151A though 151N. The control circuit 610 may control the timing and the switching frequency of each of the individual power stages 151A through 151N (e.g., may interleave or cycle between the power stages 151A through 151N).

Control circuit 610 may periodically turn on each of the power stages 151A through 151N. The control circuit 610 may control the duty cycle of each of the power stages 151A through 151N (e.g., the amount of time that each of the power stages 151A through 151N is turned on and/or turns off). The control circuit 610 may turn on each power stage 151A through 151N at different times.

Control circuit 610 may determine a respective time delay between turning on power stage 151A (e.g., a first power stage or a primary power stage) and turning on each of the additional power stages (e.g., secondary power stages 151B through 151N) based on a switching time-period of the power stage 151A.

In one embodiment, the primary circuit 111 may generate a first control signal to control power stage 151A (e.g., to turn the power stage 151A on and/or off). For example, the primary circuit 111 may periodically generate the first control signal (e.g., PWM<1>). Each time the first control signal is generated and provided to the power stage 151A, the power stage 151A may turn on for an amount of time (e.g., $T_{ON}$).

In one embodiment, the adaptive circuit 612 may determine a respective delay time (e.g., an amount of time) for each of the power stages 151B through 151N (e.g., additional power stages, secondary power stages, etc.). The adaptive circuit 612 may determine a delay between when the power stage 151A was turned on, and when the respective power stages 151B through 151N should turn on. For example, the adaptive circuit 612 may determine a first delay between when the power stage 151A was turned on and when the power stage 151B should turn on, a second delay between when the power stage 151A was turned on and when the power stage 151C should turn on, etc.

In one embodiment, the control circuit 610 may include a first set of capacitors (e.g., one or more capacitors) that are coupled to a constant current source. The first set of capacitors may be sized to determine the switching time-period for the power stage 151A (e.g., the switching period, the amount of time between when the power stage 151A is turned on). For example, the amount of time for the first set of capacitors to charge may relate to the switching time-period. The adaptive circuit 612 may include a second set of capacitors (e.g., one or more capacitors) that are coupled to a constant current source. The second set of capacitors may be sized to determine when to turn on the power stages 151B through 151N, as discussed in more detail below. For example, there may be different subsets of one or more capacitors for each of the power stages 151B through 151N. The amount of time for each subset of capacitors to charge may relate to the delay for a respective power stage. The constant current sources may be separate from the control circuit 610 and/or may be separate from the input current source that is provided to the set of power stages 150.

In one embodiment, the secondary circuits 114B through 114N may periodically turn on the power stages 151B through 151N, respectively. The secondary circuits 114B through 114N may turn on the power stages 151B through 151N based on the switching time-period of the power stage 151A. For example, secondary circuit 114B may turn on (and/or off) power stage 151B based on the switching time-period of the power stage 151A, secondary circuit 114C may turn on (and/or off) power stage 151C based on the switching time-period of the power stage 151A, etc.

As discussed above, the control circuit 610 may turn on each of the power stages 151B through 151N (e.g., additional/secondary power stages) based on a switching time-period of the power stage 151A (e.g., a first/primary power stage). This may allow the control circuit 610 to vary or change the respective delay time for the power stages 151B through 151N based on the switching time-period of the first power stage 151A. Varying the delay times for the power stages 151B through 151N may allow the control circuit to adaptively interleave the operation of the power stages 151B through 151N with the operation of the power stage 151A.

Figure 7:
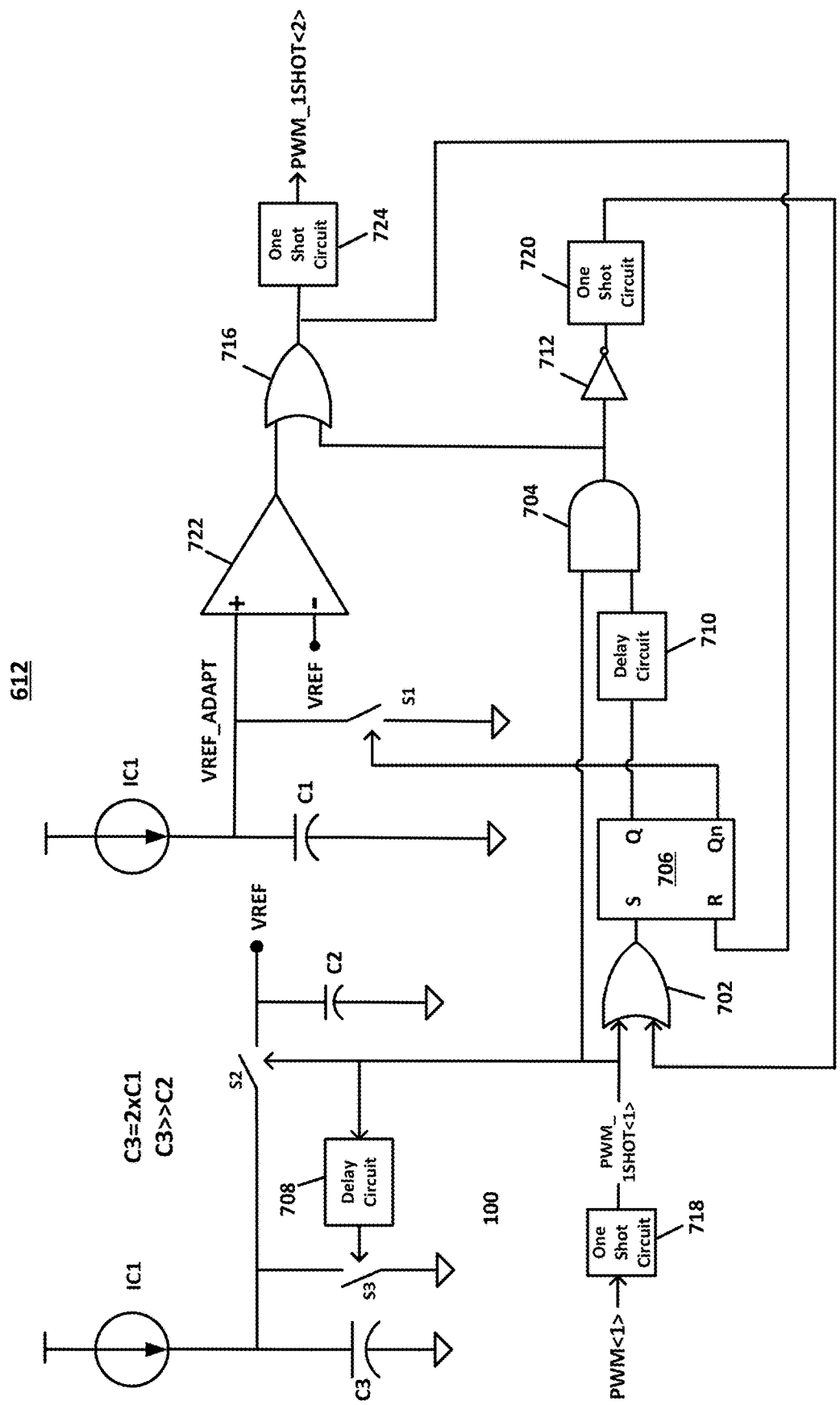
FIG. 7 illustrates the adaptive circuit of FIG. 6, according to another embodiment.

FIG. 7 illustrates the adaptive circuit 612 of FIG. 6, according to an embodiment, which can determine a respective delay time (e.g., an amount of time) for each of the power stages 151B through 151N. Adaptive circuit 612 includes a one-shot circuit 718, which generates a one-shot output signal PWM_1SHOT<1> each time PWM<1> is asserted by primary circuit 111 (illustrated in FIGS. 1 and 2). During steady-state, adaptive circuit 612 should generate PWM_1SHOT<2> after PWM<1>, and thus PWM_1SHOT<1>, are asserted. During a transition from DCM to CCM or when the frequency of PWM<1> suddenly increases to meet a change in power demanded by a load, adaptive circuit 612 generates PWM_1SHOT<2> if adaptive circuit 612 does not generate PWM_1SHOT<2> within a set amount of time after assertion of PWM<1>. In contrast to adaptive circuit 112, adaptive circuit 612 should generate PWM_1SHOT<2> when expected while apparatus 600 transitions from DCM to CCM or after a sudden increase in PWM<1> frequency. This should reduce adverse effects to the load that may otherwise occur during transition.

Adaptive circuit 612 includes a capacitor C3 (e.g., a first capacitor or a first set of capacitors). Capacitor C3 is selectively discharged to ground via switch S3 and selectively coupled to capacitor C2 via switch S2. Adaptive circuit 612 also includes capacitor C1, which is selectively discharged to ground via switch S1. Switches S1-S3 are directly or indirectly controlled by PWM_1SHOT<1>.

With reference to FIG. 7 switch S3 is directly controlled by a delay circuit 708. The delay circuit 708 and switch S2 are directly controlled by PWM_1SHOT<1> from one-shot circuit 718. PWM_1SHOT<1> is generated when signal PWM<1> is asserted by the primary circuit 111 (illustrated in FIGS. 1 and 2). PWM_1SHOT<1> is also provided to OR gate 702 and the AND gate 704. The output of OR gate 702 is provided to the S input of SR latch 706. The Q output of SR latch 706 is provided to a delay circuit 710, the output of which is provided to one of the inputs of AND gate 704. PWM_1SHOT<1> is provided to the other input to AND gate 704. The output of AND gate 704 is provided as an input to inverter 712 and to an input of OR gate 716. The output of inverter 712 is provided as an input to one-shot circuit 720, the output of which is received as an input to OR gate 702. OR gate 716 receives the output of comparator 722 and the output of AND gate 704. One-shot circuit 724 generates PWM_1SHOT<2> in response to an assertion of either input to OR gate 716. The R input of SR latch 706 receives the output of OR gate 716. Thus, the SR latch 706 is reset (i.e., Q is de-asserted and Qn is asserted) when the output of OR gate 716 is asserted. The inverted output Qn of SR latch 706 controls switch S1, which in turn is connected between the positive input terminal of comparator 722 and ground. Switch S1 discharges C1 to ground when it closed. The negative input of comparator 722 is coupled to receive VREF on capacitor C2, which in turn is coupled to switch S2.

As noted in the figure, capacitor C3 is two times the size of capacitor C1, and capacitor C3 is substantially greater than capacitor C2 in magnitude. When a prior PWM_1SHOT<1> expires (i.e., transitions from high to low), switches S2 and S3 are opened and constant current IC1 starts charging capacitor C3. The voltage on capacitor C3 increases as it charges. Switch S2 closes and switch S1 opens with the next PWM_1SHOT<1>. The voltage existing on capacitor C3 is transferred to capacitor C2 through switch S2. Voltage VREF on capacitor C2 is an input to the negative terminal of comparator 722. With switch S1 open, constant current IC1 starts charging capacitor C1. Voltage VREF_ADAPT on capacitor C1 increases as it charges. Voltage VREF_ADAPT on capacitor C1 is an input to the positive terminal of comparator 722. VREF_ADAPT and VREF are compared by comparator 722. When VREF_ADAPT exceeds VREF, comparator 722 asserts its output. However, it may take some time before voltage VREF_ADAPT rises to the level of VREF. Nonetheless when VREF_ADAPT and VREF are equal, comparator 722 will trigger one-shot circuit 724 through OR gate 716 to generate PWM_1SHOT<2>. However, PWM<1> may reassert before VREF_ADAPT rises to the level of VREF due to, for example, an increase in the switching frequency of PWM<1>. Fortunately, the reassertion of PWM<1> also retriggers one-shot circuit 718 to regenerate PWM_1SHOT<1>, which in turn triggers one-shot circuit 724 via OR gate 716 to generate PWM_1SHOT<2>. As a result, adaptive circuit 612 generates PWM_1SHOT<2> as expected even though VREF_ADAPT fails to rise to the level of VREF.

SR latch 706 is used to determine whether PWM_1SHOT<2> was generated between consecutive assertions of PWM<1>. If PWM_1SHOT<2> was generated before the next assertion of PWM<1>, then SR latch 704 was reset, and capacitor C1 was discharged before the next assertion. The next assertion of PWM<1> sets SR latch 722, which opens switch S1 and capacitor C1 begins to charge. When voltage VREF_ADAPT on C1 equals VREF, comparator 722 may trigger one-shot circuit 724 to generate PWM_1SHOT<2> unless it was triggered by AND gate 704. When PWM<1> is reasserted, SR latch 706 is set again, which starts the process of charging C1. Essentially, SR latch 706 is reset (i.e., Q is low and Qn is high) when PWM_1SHOT<2> is triggered. Thus, PWM_1SHOT<2> should triggered between assertions of PWM<1>.

The above description of illustrated embodiments of the disclosure, including what is described in the Abstract, is not intended to be exhaustive or to limit the disclosure to the precise forms disclosed. While specific embodiments of, and examples for, the disclosure are described herein for illustrative purposes, various equivalent modifications are possible within the scope of the disclosure, as those skilled in the relevant art will recognize. Other embodiments may have layers in different orders, additional layers or fewer layers than the illustrated embodiments.

Various operations are described as multiple discrete operations, in turn, in a manner that is most helpful in understanding the present disclosure, however, the order of description should not be construed to imply that these operations are necessarily order dependent. In particular, these operations need not be performed in the order of presentation.

The terms "over," "above" "under," "between," and "on" as used herein refer to a relative position of one material layer or component with respect to other layers or components. For example, one layer deposited above or over or under another layer may be directly in contact with the other layer or may have one or more intervening layers. Moreover, one layer deposited between two layers may be directly in contact with the two layers or may have one or more intervening layers. In contrast, a first layer "on" a second layer is in direct contact with that second layer. Similarly, unless explicitly stated otherwise, one feature deposited between two features may be in direct contact with the adjacent features or may have one or more intervening layers.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. The terms "first," "second," "third," "fourth," etc. as used herein are meant as labels to distinguish among different elements and may not necessarily have an ordinal meaning according to their numerical designation.

What is claimed is:

1. A power converter, comprising:
   a plurality of power stages configured to generate an output current that has an output voltage, based on an input current that has an input voltage, wherein the plurality of power stages comprises a first power stage and a plurality of additional power stages; and
   a control circuit coupled to the plurality of power stages, wherein:
      the control circuit is configured to periodically turn on each of the plurality of power stages; and
      the control circuit determines a respective time delay between turning on the first power stage and turning on each of the plurality of additional power stages based on a switching time-period of the first power stage, wherein the control circuit comprises an adaptive circuit configured to determine the respective time delay for each of the plurality of additional power stages based on the switching time-period of the first power stage;
   wherein the adaptive circuit further comprises a comparator comprising first and second inputs coupled to a first capacitor and a second capacitor and configured to assert a first signal when a voltage on the first capacitor equals or is greater than a voltage on the second capacitor; and
   wherein the adaptive circuit further comprises a circuit comprising an OR gate, the circuit coupled to receive the first signal and a second signal, wherein the circuit is configured to assert an output signal when the first signal is asserted before assertion of the second signal or when the second signal is asserted before assertion of the first signal, wherein one of the plurality of additional power stages is controlled based on the output signal.

2. The power converter of claim 1, wherein the control circuit comprises a primary circuit configured to generate a first control signal to periodically turn on the first power stage.

3. The power converter of claim 1, wherein
   the first capacitor is used to determine the switching time-period of the first power stage; and
   wherein the second capacitor is used to determine when to turn on only one of the plurality of additional power stages.

4. The power converter of claim 1, wherein:
   the control circuit further comprises a filter circuit coupled to the adaptive circuit; and
   the filter circuit is configured to filter a voltage generated by the adaptive circuit.

5. The power converter of claim 1, wherein the control circuit comprises a set of one or more secondary circuits, each of the one or more secondary circuits configured to periodically turn on a respective power stage of the plurality of additional power stages.

6. The power converter of claim 1, wherein the respective delay time for each of the plurality of additional power stages varies when the switching time-period of the first power stage varies.

7. The power converter of claim 1, wherein the power converter comprises at least one of a boost converter or a buck converter.

8. A power converter, comprising:
a means for generating an output current that has an output voltage, based on an input current that as an input voltage, wherein the means for generating comprises a first power stage and a plurality of additional power stages; and
a means for controlling the means for generating the output current, wherein:
the means for controlling the means for generating the output current is configured to periodically turn on each of the first power stage and the plurality of additional power stages; and
the means for controlling the means for generating the output current determines a respective time delay between turning on the first power stage and turning on each of the plurality of additional power stages based on a switching time-period of the first power stage, wherein the means for controlling the means for generating the output current comprises an adaptive circuit configured to determine the respective time delay for each of the plurality of additional power stages based on the switching time-period of the first power stage;
wherein the adaptive circuit further comprises a comparator comprising first and second inputs coupled to a first capacitor and a second capacitor and configured to assert a first signal when a voltage on the first capacitor equals or is greater than a voltage on the second capacitor; and
wherein the adaptive circuit further comprises a circuit comprising an OR gate, the circuit coupled to receive the first signal and a second signal, wherein the circuit is configured to assert an output signal when the first signal is asserted before assertion of the second signal or when the second signal is asserted before assertion of the first signal, wherein one of the plurality of additional power stages is controlled based on the output signal.

9. The power converter of claim 8, wherein the means for controlling the means for generating the output current comprises a primary circuit configured to generate a first control signal to periodically turn on the first power stage.

10. The power converter of claim 8, wherein
the first capacitor is used to determine the switching time-period of the first power stage; and
wherein the second capacitor is used to determine when to turn on only one of the plurality of additional power stages.

11. The power converter of claim 8, wherein:
the means for controlling the means for generating the output current further comprises a filter circuit coupled to the adaptive circuit; and
the filter circuit is configured to filter a voltage generated by the adaptive circuit.

12. The power converter of claim 8, wherein the means for controlling the means for generating the output current comprises a set of one or more secondary circuits, each of the one or more secondary circuits configured to periodically turn on a respective power stage of the plurality of additional power stages.

13. The power converter of claim 8, wherein the respective delay time for each of the plurality of additional power stages varies when the switching time-period of the first power stage varies.

14. A method, comprising:
determining a switching time-period of a first power stage of a plurality of power stages, wherein:
the plurality of power stages comprises the first power stage and a plurality of additional power stages; and
the plurality of power stages is configured to generate an output current that has an output voltage, based on an input current that as an input voltage;
determining, by an adaptive circuit, a respective time delay between turning on the first power stage and turning on each of the plurality of additional power stages based on the switching time-period of the first power stage, wherein the adaptive circuit comprises a comparator comprising first and second inputs coupled to a first capacitor and a second capacitor;
asserting, by the adaptive circuit, a first signal when a voltage on the first capacitor equals or is greater than a voltage on the second capacitor, wherein the adaptive circuit further comprises a circuit comprising an OR gate, wherein the circuit is coupled to receive the first signal and a second signal; and
asserting an output signal when the first signal is asserted before assertion of the second signal or when the second signal is asserted before assertion of the first signal, wherein one of the plurality of additional power stages is controlled based on the output signal.

* * * * *